(12) United States Patent
Sato et al.

(10) Patent No.: US 11,602,881 B2
(45) Date of Patent: Mar. 14, 2023

(54) INSERT CUTTING AND WEATHERSTRIP MANUFACTURING METHOD

(71) Applicant: TOYODA GOSEI CO., LTD., Kiyosu (JP)

(72) Inventors: Takaaki Sato, Kiyosu (JP); Shohei Mizuno, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 205 days.

(21) Appl. No.: 16/907,601

(22) Filed: Jun. 22, 2020

(65) Prior Publication Data

US 2021/0008777 A1    Jan. 14, 2021

(30) Foreign Application Priority Data

Jul. 11, 2019  (JP) .............................. JP2019-128939

(51) Int. Cl.
| | | |
|---|---|---|
| *B29C 48/12* | (2019.01) | |
| *B60J 10/18* | (2016.01) | |
| *B29C 48/154* | (2019.01) | |
| *B29C 48/00* | (2019.01) | |
| *B29L 31/30* | (2006.01) | |
| *B29K 23/00* | (2006.01) | |
| *B60J 10/246* | (2016.01) | |

(52) U.S. Cl.
CPC .......... *B29C 48/12* (2019.02); *B29C 48/0022* (2019.02); *B29C 48/154* (2019.02); *B60J 10/18* (2016.02); *B29K 2023/16* (2013.01); *B29L 2031/302* (2013.01); *B60J 10/246* (2016.02)

(58) Field of Classification Search
CPC ............... B29L 2031/302; B29C 48/12; B29C 48/0022; B29C 48/154; B29C 48/155; B29C 48/19; B29C 48/21; B60J 10/18; Y10T 83/9416
See application file for complete search history.

(56) References Cited

U.S. PATENT DOCUMENTS

| | | | | |
|---|---|---|---|---|
| 2008/0295667 A1* | 12/2008 | Spiga | ..................... | B23D 15/08 83/694 |
| 2010/0086732 A1* | 4/2010 | Tamura | ................... | B29C 48/09 427/230 |

FOREIGN PATENT DOCUMENTS

| | | |
|---|---|---|
| JP | H11-321480 A | 11/1999 |
| JP | 2010-6243 A | 1/2010 |

OTHER PUBLICATIONS

English Translation of JPH 11321480A retrieved from Espacenet on Mar. 2, 2022 (Year: 2022).*

* cited by examiner

*Primary Examiner* — Francisco W Tschen
*Assistant Examiner* — Elisa H Vera
(74) *Attorney, Agent, or Firm* — Posz Law Group, PLC

(57) ABSTRACT

A weatherstrip manufacturing method is a method for manufacturing a weatherstrip which includes a trim portion where an insert is embedded. The insert includes short connecting portions that connect strips at substantially regular intervals, and a long connecting portion having a larger length than each length of the short connecting portions. The method includes an extrusion molding step for covering the insert with a polymer material, a cut-off portion forming step for cutting off a part of a long interval portion including the long connecting portion in the long interval portion where the long connecting portion is embedded to form a cut-off portion, and a cutting step for cutting the cut-off portion in (Continued)

a crossing direction orthogonal to a longitudinal direction to divide the weatherstrip in the longitudinal direction.

7 Claims, 7 Drawing Sheets

(a)

(b)

(a)

(b)

INSERT CUTTING AND WEATHERSTRIP MANUFACTURING METHOD

BACKGROUND OF THE INVENTION

(1) Field of the Invention

The present invention relates to a weatherstrip manufacturing method for manufacturing a weatherstrip including an insert and attached to an opening or the like of an automobile body, and particularly to a cutting method of the weatherstrip.

(2) Description of Related Art

For example, a weatherstrip made of rubber or resin and attached to an opening of an automobile body or the like includes a shape maintenance insert (also called "cored bar") made of metal and embedded inside the rubber or resin to maintain a shape of a trim portion having a substantially U-shaped cross section. The insert made of metal has a structure constituted by many strips connected by a connecting portion.

The weatherstrip described above is cut into pieces each having a predetermined length before use, and therefore the insert is simultaneously cut by the cutting of the weatherstrip. However, the cutting at a strip portion causes deformation of a cut surface or exposure of the insert. In this case, the cut surface does not become smooth. Accordingly, manual correction of the deformation or manual extraction of the exposed insert is needed as a subsequent step. This necessity requires considerable time and labor, thereby deteriorating workability. In addition, the exposed cut surface of the strip or the shape of the strip has a sharp portion. In this case, sticking of the strip into a hand during manual work, or other problems in terms of safety arise.

For example, techniques described in JP 2010-6243 A and JP 11-321480 A are known as techniques for solving the above problems. A cutting method of a weatherstrip or the like disclosed in JP 2010-6243 A will be described with reference to FIGS. 8A and 8B. FIG. 8A is a perspective view of a cored bar 200. The cored bar 200 is configured such that central portions of bone pieces 210 are connected at regular intervals by a connecting portion 220. FIG. 8B is a side view showing an overall configuration of a trim portion cutting apparatus.

According to the cutting method of the weatherstrip and the like using the apparatus shown in FIG. 8B as disclosed in JP 2010-6243 A, the connecting portion 220 of the cored bar 200 to be inserted into a trim portion 100 is initially detected by a proximity switch (not shown). A die set 700 where the trim portion 100 is clamped with a rubber clip (not shown) is positioned such that the connecting portion 220 is located immediately below a movable blade 300. Subsequently, a receiving blade 400 is inserted from an opening side of the trim portion 100, and the movable blade 300 is pushed downward in a state where the trim portion 100 is supported from below. In this condition, cutting of the connecting portion 220 is performed in cooperation with the receiving blade 400. Finally, rubber clips on both sides of the cut are pulled in directions away from each other to widen the cut. A cutter 500 in the same plane as that of the movable blade 300 is inserted into the cut with the cut widened. The trim portion 100 is cut between the bone pieces 210. Further disclosed as an advantageous effect of the technique is that a weatherstrip or the like using the general-purpose cored bar 200 and having a smooth cut surface can be obtained.

Next, JP 11-321480 A will be described with reference to FIG. 9. The trim portion 100 of JP 11-321480 A includes the cored bar 200 constituted by a general portion 240 where bone pieces 210 are arranged with short connecting portions 230 interposed between the bone pieces 210, and a long interval portion 260 where the bone pieces 210 are arranged with a long connecting portion 250 interposed between the bone pieces 210. The long connecting portion 250 has a length twice larger or more than each length of the short connecting portions 230. The trim portion 100 further includes a synthetic resin portion 600 covering the cored bar 200. Further disclosed is a method for cutting the trim portion 100 at the long interval portion 260. In addition, disclosed as an advantageous effect is that a smooth cut surface (cross section at the left end in FIG. 9) is obtained with exposure of only a cross section of the long connecting portion 250 of the cored bar 200 and without exposure of the bone pieces 210.

SUMMARY OF THE INVENTION

Meanwhile, a longitudinal length of the connecting portion 220 of the cored bar 200 (typically used for a trim portion of a general-purpose weatherstrip or the like) included in JP 2010-6243A described above is small approximately in a range from 0.5 mm to 1 mm. In this case, variations produced during manufacturing need to be taken into consideration. Moreover, it is difficult to completely prevent positional deviation of the bone pieces 210, that is, oblique deformation of the bone pieces 210 with respect to the connecting portion 220 during manufacturing of the cored bar 200 or during transfer of polymer material such as rubber and resin before an extrusion step. Furthermore, according to a weatherstrip or the like which includes a hollow portion having a sealing function, for example, a wall thickness of a polymer material portion near the connecting portion 220 of the cored bar 200 is not constant in many cases in the trim portion 100 having a substantially U-shaped cross section. In addition, positional deviation is also produced due to variations during control for detecting and positioning the connecting portion 220 of the cored bar 200 to be inserted into the trim portion 100 using a proximity switch or the like.

In consideration of the above circumstances, therefore, in the case of the cutting method of JP 2010-6243 A, the cutter 500 may come into contact with the bone pieces 210 at the time of detection and cutting of the connecting portion 220 of the cored bar 200 inserted into the trim portion 100 using the proximity switch, and subsequent cutting of the trim portion 100 using the cutter 500. In this case, the cutter 500 does not have a large shearing force, wherefore a rubber material 610 is cut while sliding on the bone pieces 210. As a result, the cut surface does not become smooth with exposure of the bone pieces 210, or the apparatus becomes unable to cut and stops when the cutter 500 bites into the bone pieces 210. Moreover, the life of the cutter 500 considerably decreases.

On the other hand, according to the method disclosed in JP 11-321480 A described above, a large shearing force is required to cut the long connecting portion 250 of the cored bar 200. When the trim portion 100 is cut with a large shearing force by a cutter or the like, a smooth cut surface is difficult to obtain due to a difference in hardness between the synthetic resin portion 600 and the long connecting portion 250 of the cored bar 200. Moreover, the cut portion of the cored bar 200 is deformed. Furthermore, the cross section of the long connecting portion 250 of the cored bar 200 is exposed, wherefore a sharp edge is left on the exposed surface.

Accordingly, there remain problems in terms of work, such as correction of deformation of the exposed portion of the cored bar 200, removal of the exposed portion, and others requiring considerable time and labor, and problems in terms of safety such as sticking of the exposed sharp portion into a hand.

For solving the aforementioned problems, claim 1 of the present invention is directed to a weatherstrip manufacturing method for manufacturing a weatherstrip that includes a trim portion having a substantially U-shaped cross section and including an insert embedded in the trim portion, the insert having a belt shape and including strips connected via a connecting portion. The connecting portion of the insert includes short connecting portions that connect the strips at substantially regular intervals, and a long connecting portion that has a larger length than each length of the short connecting portions. The method includes: an extrusion molding step for covering the insert with a polymer material; a cut-off portion forming step for cutting off a part of a long interval portion including the long connecting portion in the long interval portion where the long connecting portion is embedded to form a cut-off portion; and a cutting step for cutting the cut-off portion in a crossing direction orthogonal to a longitudinal direction to divide the weatherstrip in the longitudinal direction.

According to claim 1 of the present invention, the connecting portion of the insert has the long connecting portion. Accordingly, deformation of the weatherstrip in the longitudinal direction is prevented during transportation after the extrusion molding step for covering by the polymer material.

Further included are the cut-off portion forming step for cutting off a part of the long interval portion including the long connecting portion to form the cut-off portion, and the cutting step for cutting the cut-off portion in the crossing direction orthogonal to the longitudinal direction to divide the weatherstrip in the longitudinal direction. In this case, only the polymer material portion is cut without contact between the cutting blade and the strips as well as the connecting portion of the insert when the cut-off portion is cut in the crossing direction orthogonal to the longitudinal direction. Accordingly, a smooth cut surface can be obtained.

Moreover, exposure of the insert is avoided. In this case, the necessity of manual post-processing such as removal of an exposed portion of the insert and correction of deformation as conventionally required is eliminated. Accordingly, simplification of a manufacturing step and automation are both achievable. Further, the cutting blade used during cutting of the cut-off portion in the crossing direction orthogonal to the longitudinal direction does not contact the insert. In this case, the life of the cutting blade increases. Accordingly, considerable advantageous effects are offered in terms of quality and cost.

Claim 2 of the present invention is directed to a weatherstrip manufacturing method that includes a long connecting portion forming step for forming the long connecting portion by cutting the strip in the short connecting portion of the insert before the extrusion molding step. According to claim 2 of the present invention, the long connecting portion forming step is included to form the long connecting portion by cutting the strip in the short connecting portion of the insert before the extrusion molding step. In this case, use as a general-purpose insert is allowed without the necessity of producing a dedicated new insert for each weatherstrip. Accordingly, a cost increase is avoidable.

Claim 3 of the present invention is directed to a weatherstrip manufacturing method where the cut-off portion forming step is performed by using an upper blade (punch) that is a movable blade, and a lower blade (die) that is a fixed blade, and inserting the upper blade (punch) from an opening side of the trim portion.

According to a weatherstrip which includes a hollow portion having a sealing function, a wall thickness of a polymer material portion is not constant in many cases not in an opening of a trim portion having a substantially U-shaped cross section, but is substantially constant near the opening of the trim portion. According to claim 3 of the present invention, the cut-off portion forming step uses the upper blade (punch) that is a movable blade, and the lower blade (die) that is a fixed blade, and inserts the upper blade (punch) from the opening side of the trim portion. Accordingly, a part of the long interval portion including a predetermined position of the long connecting portion can be accurately cut off to form the cut-off portion.

Claim 4 of the present invention is directed to a weatherstrip manufacturing method where the lower blade (die) includes a projection that includes an inclined surface extending toward the upper blade (punch). According to the weatherstrip where the insert is embedded, the insert cannot be directly held by the lower blade (die) in the state where the insert is embedded in the polymer material when the cut-off portion is formed using the upper blade (punch) and the lower blade (die) that is a fixed blade. In this case, a polymer material having low hardness comes into contact with the lower blade (die). Accordingly, when the cut-off portion is formed in the trim portion of the weatherstrip where the insert is embedded by using the upper blade (punch) and the lower blade (die), a bending point of the insert is generated on the outer side (outer periphery) of the upper blade (punch). As a result, the insert is deformed toward the lower blade (die) at the cut-off portion. When this deformation is large, correction of the weatherstrip is needed after division in the longitudinal direction.

According to claim 4 of the present invention, the lower blade (die) has the projection which includes the inclined surface extending toward the upper blade (punch). Accordingly, the projection bites the polymer material portion during formation of the cut-off portion, thereby preventing generation of the bending point of the insert on the outer side (outer periphery) of the upper blade (punch). Deformation of the cut-off portion of the insert toward the lower blade (die) is therefore avoidable.

The connecting portion of the insert has the long connecting portion. Accordingly, deformation of the weatherstrip in the longitudinal direction is prevented during transportation after the extrusion molding step for covering by the polymer material. Further included are the cut-off portion forming step for cutting off a part of the long interval portion including the long connecting portion to form the cut-off portion, and the cutting step for cutting the cut-off portion in the crossing direction orthogonal to the longitudinal direction to divide the weatherstrip in the longitudinal direction. In this case, only the polymer material portion is cut without contact between the cutting blade and the strips as well as the connecting portion of the insert when the cut-off portion is cut in the crossing direction orthogonal to the longitudinal direction. Accordingly, a smooth cut surface can be obtained.

Moreover, exposure of the insert is avoided. In this case, the necessity of manual post-processing such as removal of an exposed portion of the insert and correction of deformation as conventionally required is eliminated. Accordingly, simplification of a manufacturing step and automation are both achievable. Further, the cutting blade used during cutting of the cut-off portion in the crossing direction orthogonal to the longitudinal direction does not contact the insert. In this case, the life of the cutting blade increases. Accordingly, considerable advantageous effects are offered in terms of quality and cost.

DETAILED DESCRIPTION OF PREFERRED EMBODIMENTS

An embodiment of the present invention will be described with reference to FIGS. 1 to 7. A weatherstrip 10 in FIG. 1 is an automobile opening trim weatherstrip for sealing between an automobile door and a periphery of a vehicle body opening.

Figure 1:
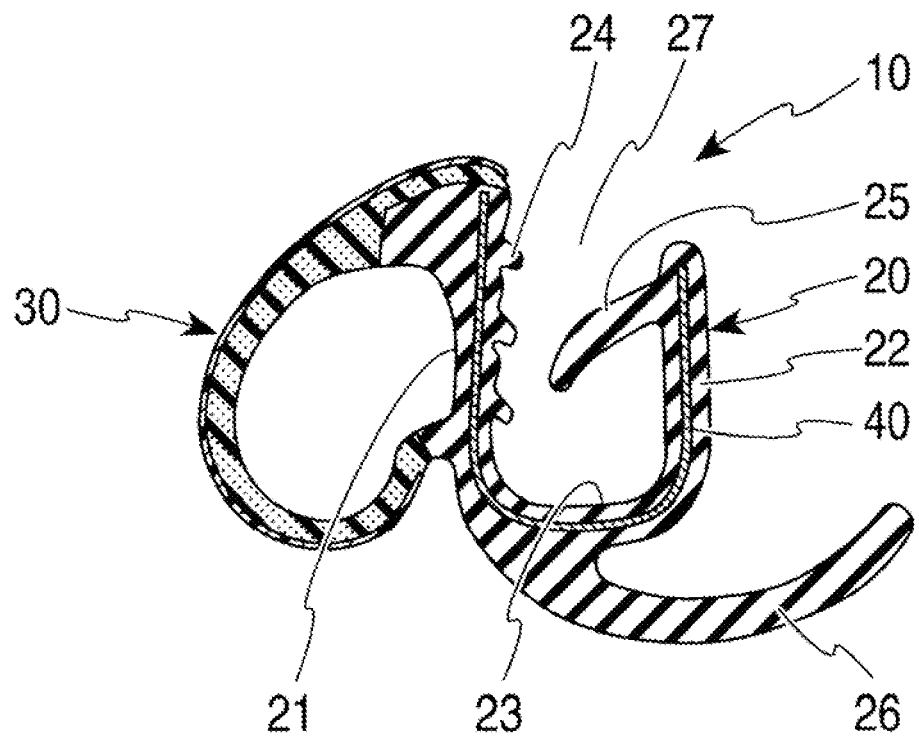
FIG. 1 is a cross-sectional view of a weatherstrip according to an embodiment of the present invention at a portion where an insert is embedded.

As shown in FIG. 1, the weatherstrip 10 has a hollow seal portion 30 and a trim portion 20 having a substantially U-shaped cross section, and is attached to a flange (not shown) by the trim portion 20. The trim portion 20 has a substantially U-shaped cross section, and is constituted by a vehicle exterior side wall 21, a vehicle interior side wall 22, and a bottom wall 23. An insert 40 made of iron is embedded in the trim portion 20 to maintain the substantially U-shaped cross section. The insert 40 will be described below. A vehicle exterior side holding lip 24 and a vehicle interior side holding lip 25 for grasping the flange are formed on inner surfaces of the vehicle exterior side wall 21 and the vehicle interior side wall 22, respectively, each having a substantially U-shaped cross section. When the flange is inserted from the opening 27 side of the trim portion 20, tips of the vehicle exterior side holding lip 24 and the vehicle interior side holding lip 25 are bent and pressed against corresponding side surfaces of the flange to hold the flange. Attachment of the weatherstrip 10 is achievable in this manner. Moreover, a lip 26 is so provided as to extend from the bottom wall 23 toward the interior of the vehicle. Meanwhile, one tip of the hollow seal portion 30 is connected to a tip of the vehicle exterior side wall 21, and the other tip is connected to a vicinity of a portion continuous with the bottom wall 23 of the vehicle exterior side wall 21.

The weatherstrip 10 includes EPDM (ethylene propylene diene rubber) as a rubber material, a solid material constituting the trim portion 20, and a sponge material constituting the hollow seal portion 30.

Figure 2:
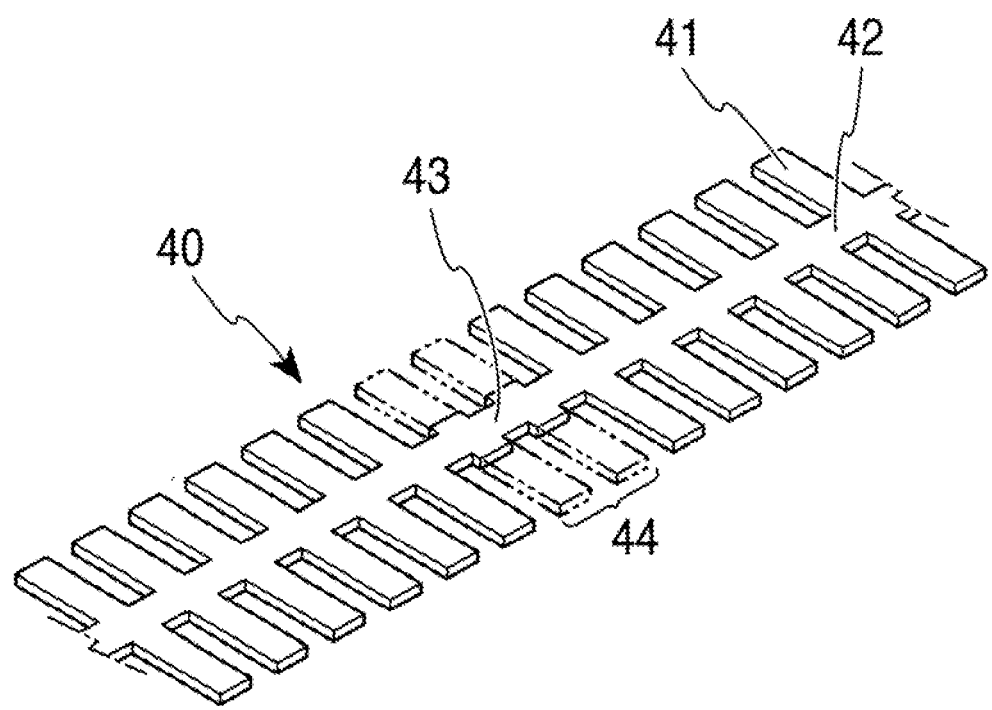
FIG. 2 is a perspective view of the insert used in the weatherstrip according to the embodiment of the present invention in a state where the insert is placed on a flat plate after a long connecting portion forming step.

FIG. 2 is a plan view of the insert 40 having a flat plate shape after a long connecting portion forming step. As shown in FIG. 2, the insert 40 is belt-shaped and constituted by strips 41 each having a substantially rectangular shape. Central portions of the respective strips 41 are connected by short connecting portions 42 such that the strips 41 are arranged at regular intervals. A long connecting portion 43 is formed by punching out the strips 41 of the pre-punching insert at a position where a long interval portion 44 is to be formed. The insert 40 is made of iron, and has a thickness of 0.45 mm. Each of the strips 41 has a width of 2 mm. Each of the short connecting portions 42 has a length of 0.9 mm in the longitudinal direction. Two pairs of the strips 41 are punched out to form the long interval portion 44. Note that the number of the strips 41 punched out to form the long connecting portion 43 is not limited to two pairs, but is determined in consideration of positioning accuracy at the time of cutting, such as accuracy associated with each width of the strips 41, each longitudinal length of the short connecting portions 42, and a transportation speed of a manufacturing apparatus 50 shown in FIG. 3.

The width of each of the short connecting portions 42 of the insert 40 is 2.9 mm (the same applies to the long connecting portion 43). Note that each width of the short connecting portions 42 and the long connecting portion 43 of the insert 40 is preferably in a range from 2 mm to 5 mm. When the width is smaller than 2 mm, both the short connecting portions 42 and the long connecting portion 43 become thin. Particularly at the long connecting portion 43, the insert 40 itself or the trim portion 20 is deformed in the longitudinal direction, or the trim portion 20 is twisted during transportation. On the other hand, when the width exceeds 5 mm, a bending process is difficult to perform in a following stage. In addition, the weatherstrip 10 including the trim portion 20 becomes heavy.

The width of each of the strips 41 is preferably in a range from 1 mm to 2.5 mm. When the width of each of the strips 41 is smaller than 1 mm, each of the strips 41 itself has low strength and is easily deformed. On the other hand, when the width of each of the strips 41 exceeds 2.5 mm, the weatherstrip 10 including the trim portion 20 becomes heavy.

Meanwhile, each of the short connecting portions 42 preferably has a length in a range from 0.3 mm to 1.5 mm. When each of the short connecting portions 42 has a length smaller than 0.3 mm, processing is difficult to perform. Moreover, the number of the strips 41 contained in the trim portion 20 increases, and therefore the weatherstrip 10 becomes heavy. On the other hand, when the width of each of the short connecting portions 42 exceeds 1.5 mm, the shapes of the strips 41 in the trim portion 20 are clearly projected in a rib-pattern at the time of covering by a polymer material portion 80 using an extruder 54. This condition is not a desirable condition.

Figure 3:
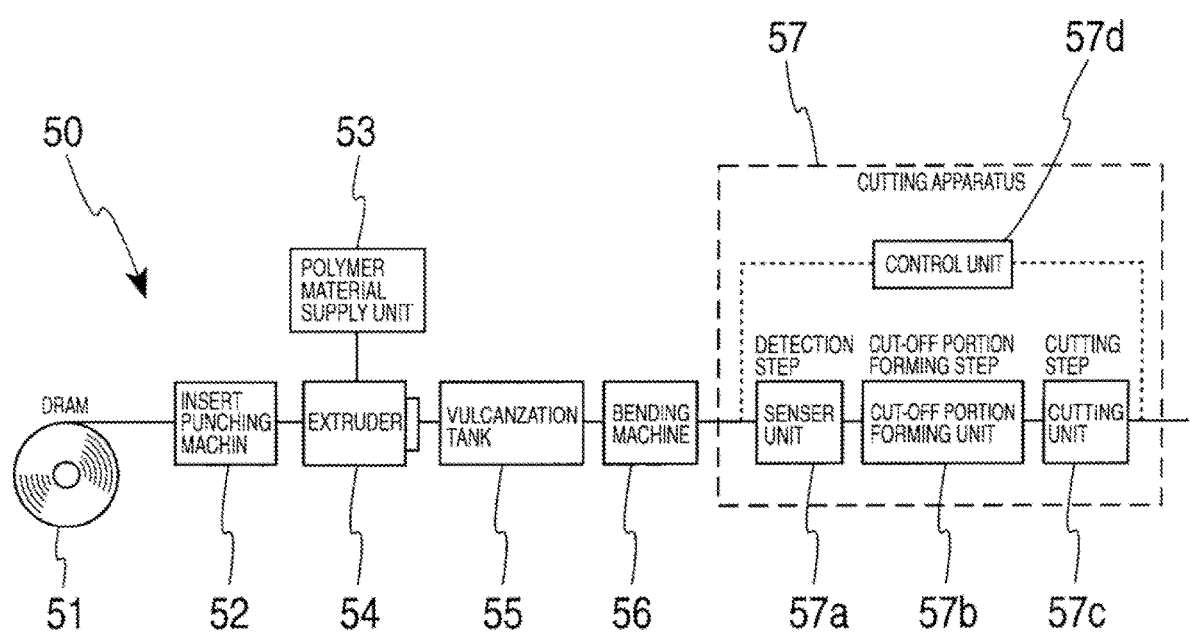
FIG. 3 is a schematic front diagram showing an apparatus for manufacturing the weatherstrip according to the embodiment of the present invention.

Next, the manufacturing apparatus 50 and a manufacturing process for manufacturing the weatherstrip 10 configured as above will be described with reference to FIG. 3. As shown in FIG. 3, a drum 51 is arranged at a front end (left end in the figure). An insert before punching formed such that the central portions of the strips 41 are connected at regular intervals by the short connecting portions 42 is wound around the drum 51. An insert punching machine 52 is disposed at the rear of the drum 51 (right side of the figure). Two pairs of the strips 41 of the insert before punching are punched at a position where the long interval portion 44 is to be formed to form the insert 40 which includes the long connecting portion 43 having a length larger than the length of each of the short connecting portions 42 (long connecting portion forming step). Note that the long connecting portion forming step using the insert punching machine 52 is not needed when the insert 40 which includes the long connecting portion 43 formed beforehand is employed.

The extruder 54 disposed at the rear of the insert punching machine 52 includes a polymer material supply unit 53 for supplying two types of EPDM or other rubber materials for the trim portion 20 and the hollow seal portion 30 to the extruder 54. The two types of EPDM or other rubber materials for the trim portion 20 and the hollow seal portion 30 are supplied to the extruder 54.

At the rear of the extruder 54, the trim portion 20 where the insert 40 is embedded is sent to a vulcanization tank 55, and vulcanized in the vulcanization tank 55. Thereafter, the trim portion 20 is bent into a substantially U-shaped cross section by a bending machine 56. The trim portion 20 is then sent to a cutting apparatus 57.

The manufacturing apparatus 50 described above is an apparatus for manufacturing the trim portion 20 and the hollow seal portion 30 using a rubber material of EPDM. However, a thermoplastic elastomer such as TPV (dynamically crosslinkable thermoplastic elastomer) may also be used for manufacturing these portions. In this case, the vulcanization tank 55 is unnecessary.

The cutting apparatus 57 includes a detection step 57a for detecting the long interval portion 44 of the insert 40 by using an eddy current type proximity sensor (not shown), a cut-off portion forming step 57b for cutting off a part of the long interval portion 44 including the long connecting portion 43 to form a cut-off portion 60 in the long interval portion 44 of the insert 40, and a cutting step 57c for cutting the cut-off portion 60 in a crossing direction orthogonal to the longitudinal direction. The cutting apparatus 57 further includes a control unit 57d which detects the long interval portion 44 of the insert 40 of the weatherstrip 10 during transportation, and performs controls such as alignment between positions of an upper blade (punch) 70 which is a movable blade, and a lower blade (die) 71 which is a fixed blade in the cut-off portion forming step 57b, alignment with a cutter 74 which is a cutting blade in the cutting step 57c, and re-transportation after cutting.

The weatherstrip 10 is transported in a state where the opening 27 opened in the trim portion 20 and having a substantially U-shaped cross section faces upward. In the detection step 57a of the cutting apparatus 57, the long connecting portion 43 of the insert 40 embedded in the trim portion 20 is initially detected by the eddy current type proximity sensor (not shown), and stopped at a predetermined position. In addition, alignment is made between the upper blade (punch) 70 and the lower blade (die) 71 which is a fixed blade both for cutting off a part of the long interval portion 44 including the long connecting portion 43 to form the cut-off portion 60.

Figure 4:
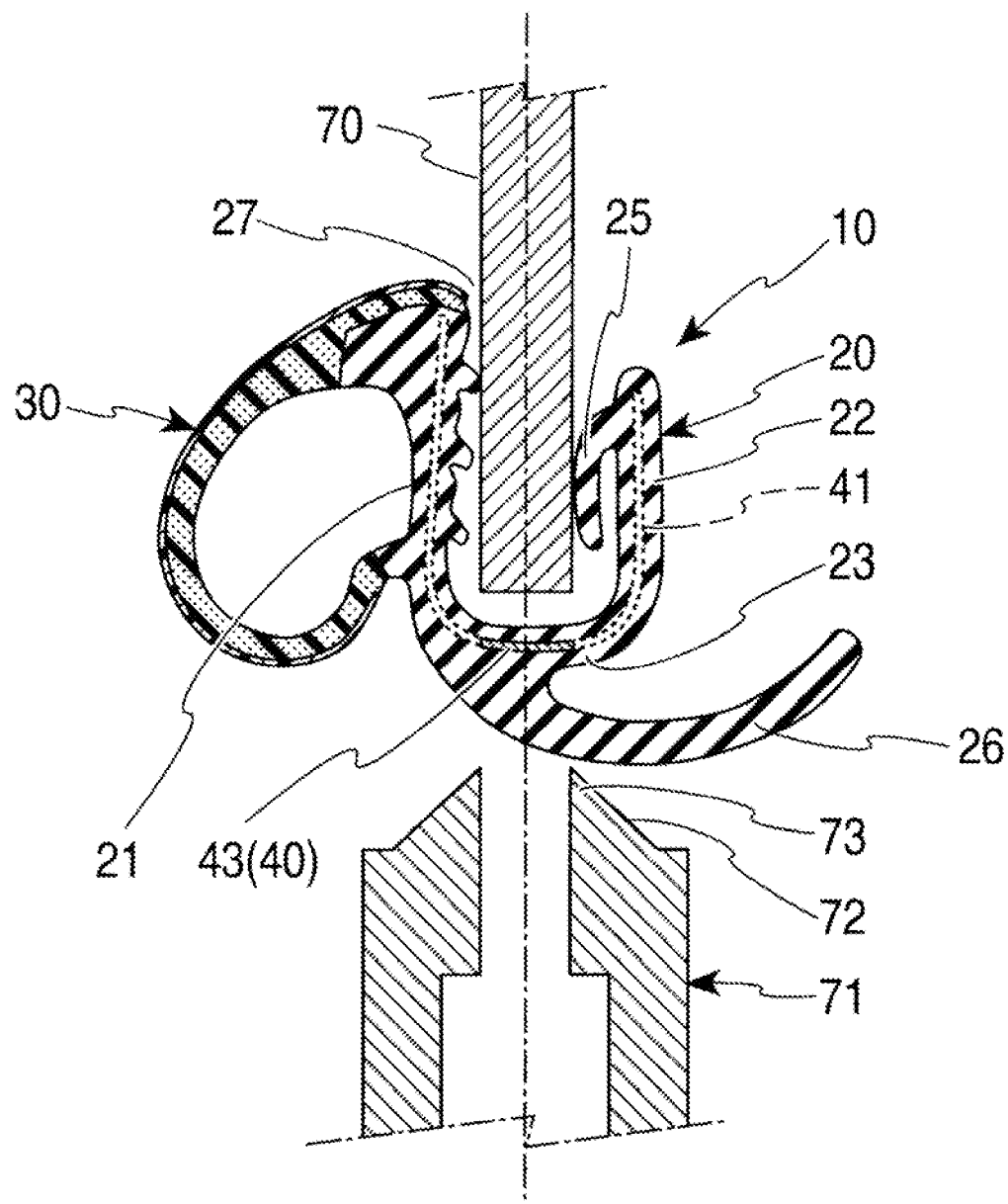
FIG. 4 is a cross-sectional view showing a relationship between an upper blade (punch) which is a movable blade, and a lower blade (die) which is a fixed blade in a cut-off portion forming step for manufacturing the weatherstrip according to the embodiment of the present invention.
Figure 5:
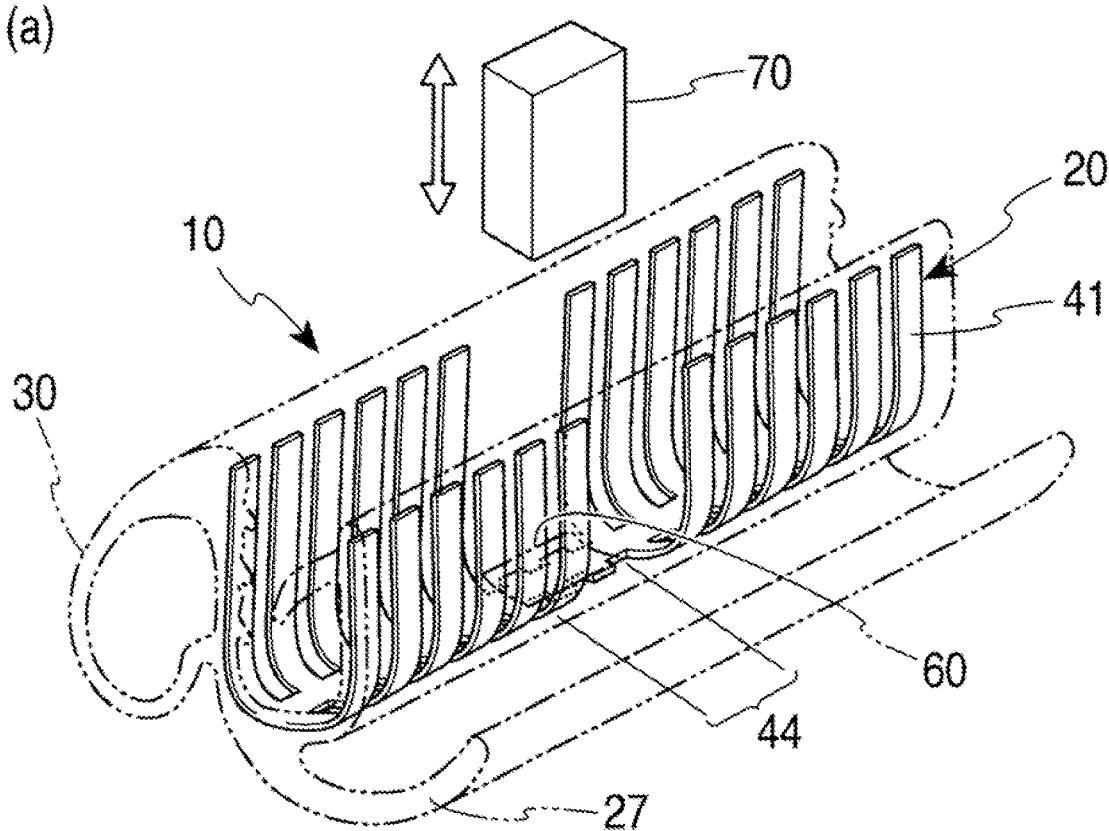
FIGS. 5A and 5B are schematic explanatory views of a cut-off portion forming step, and a cutting step, respectively, performed by the apparatus for manufacturing the weatherstrip according to the embodiment of the present invention.
Figure 5:
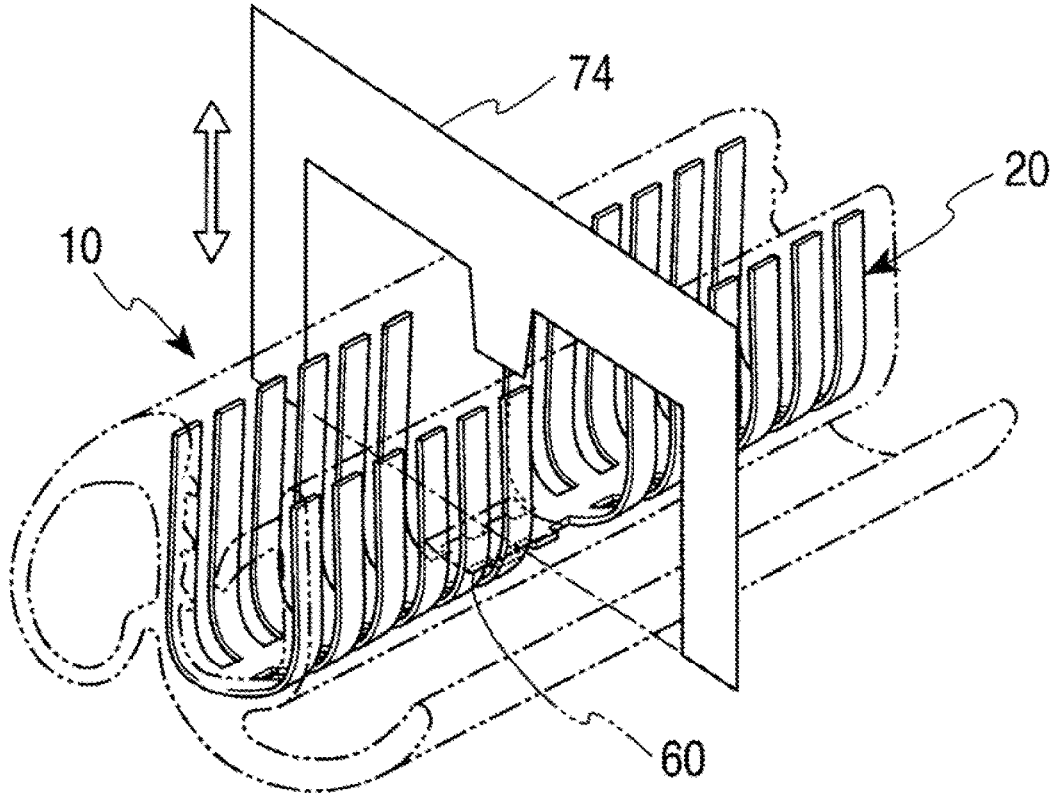

In the subsequent cut-off portion forming step 57b, as shown in FIGS. 4 and 5A, the upper blade (punch) 70 is inserted from the opening 27 side of the trim portion 20. In this condition, a part of the long interval portion 44 including the long connecting portion 43 is cut off by cooperative operations of the upper blade (punch) 70 which is a movable blade and the lower blade (die) 71 which is a fixed blade, i.e., by so-called shearing. According to the present embodiment, a region of 5.8 mm×6.8 mm, which has a length of 5.8 mm in the longitudinal direction and a length of 3.4 mm on both sides of a longitudinal center axis of the long connecting portion 43 of the insert 40, is cut off as the cut-off portion 60. Note that the region of the cut-off portion 60 may be appropriately set in accordance with the length of the long connecting portion 43 of the insert 40 and the width of the insert 40 to be used.

Figure 6:
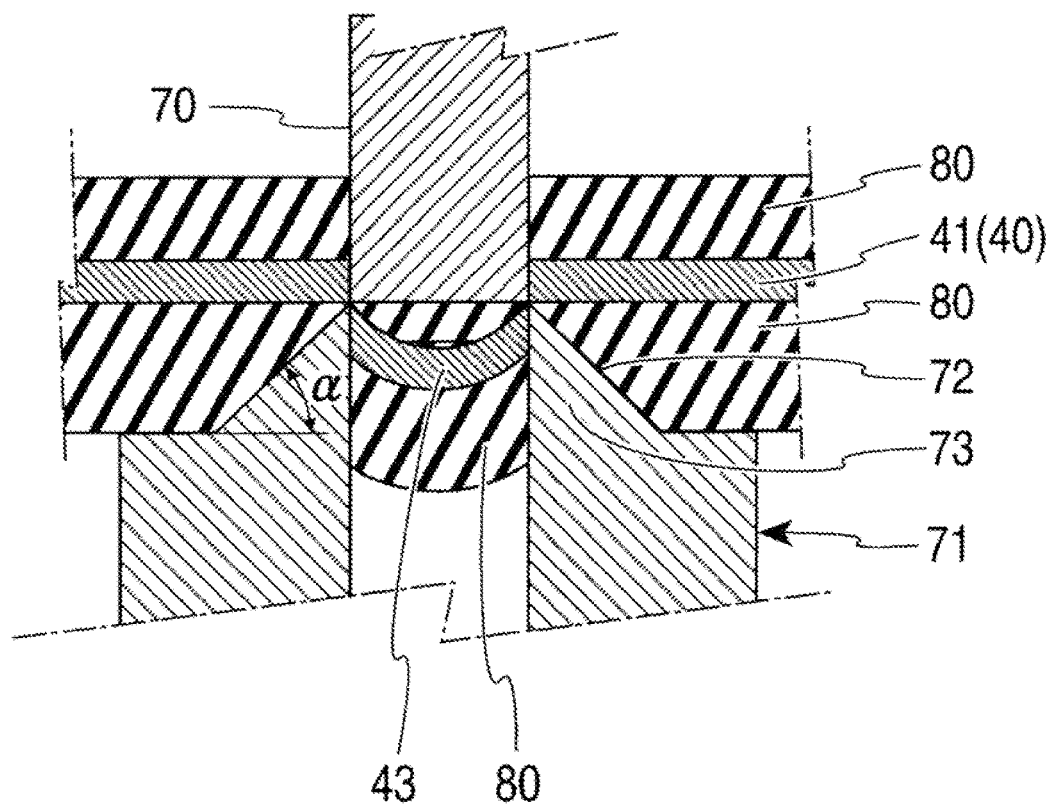
FIG. 6 is a schematic explanatory diagram of a mechanism at the time of cutting the insert of the weatherstrip according to the embodiment of the present invention.
Figure 7:
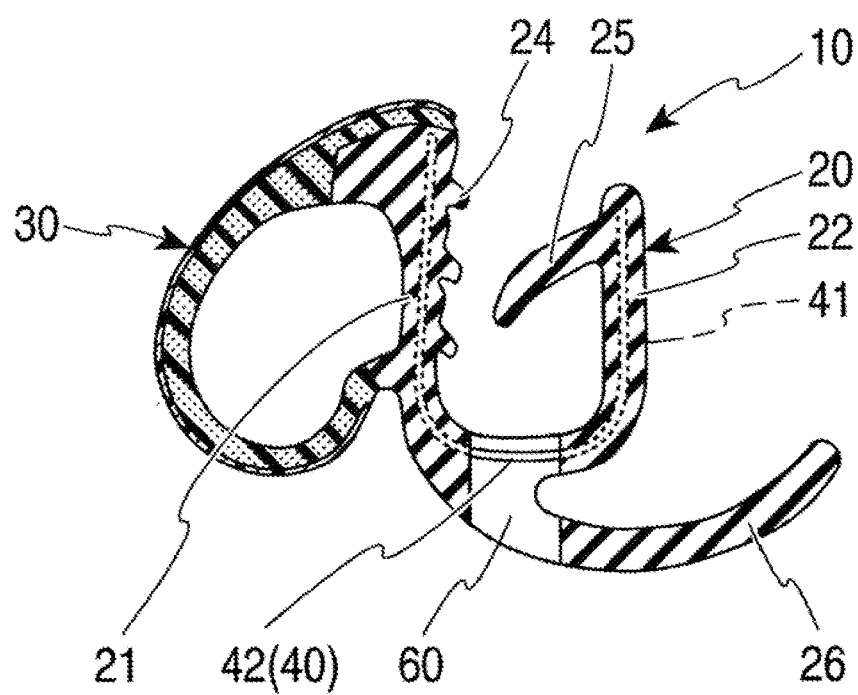
FIG. 7 is a cross-sectional view after cutting the weatherstrip according to the embodiment of the present invention.
Figure 8:
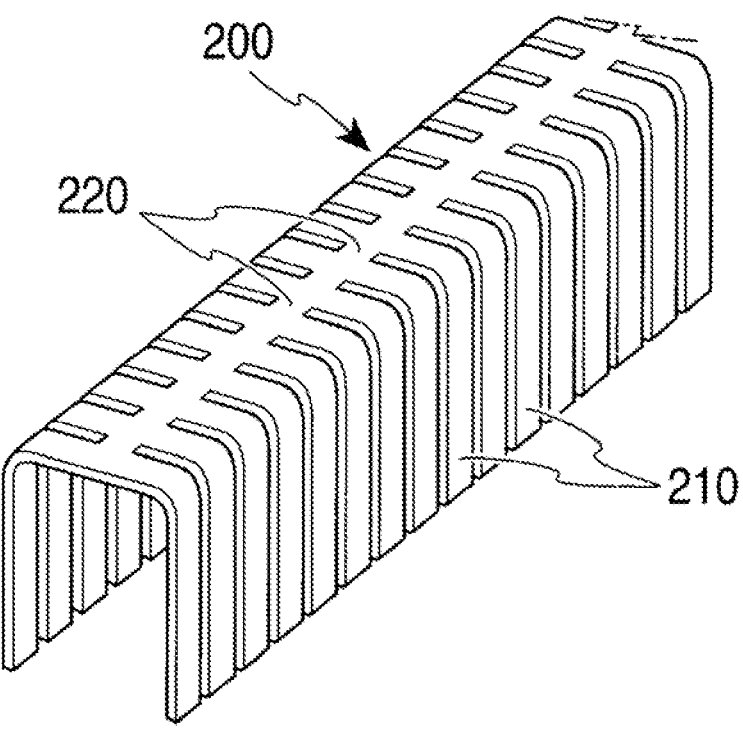
FIG. 8A is a perspective view of a cored bar.
FIG. 8B is a side view showing an overall configuration of a trim portion cutting apparatus, both disclosed in JP 2010-6243 A as a background art.
Figure 8:
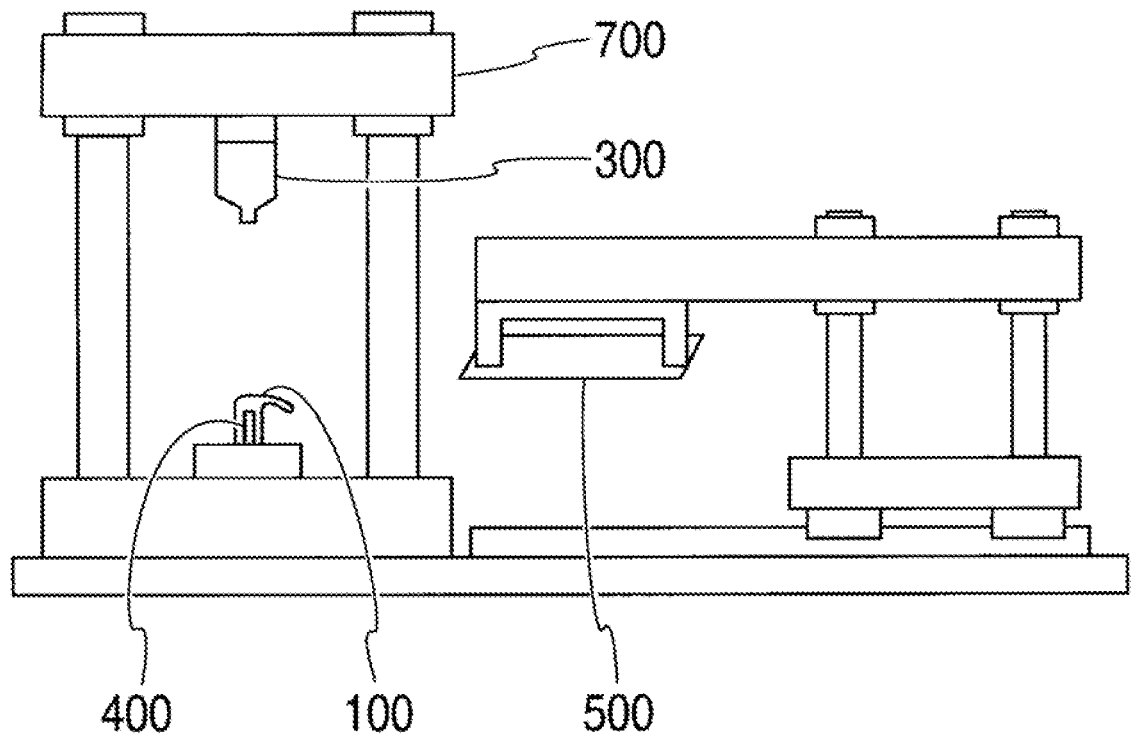
Figure 9:
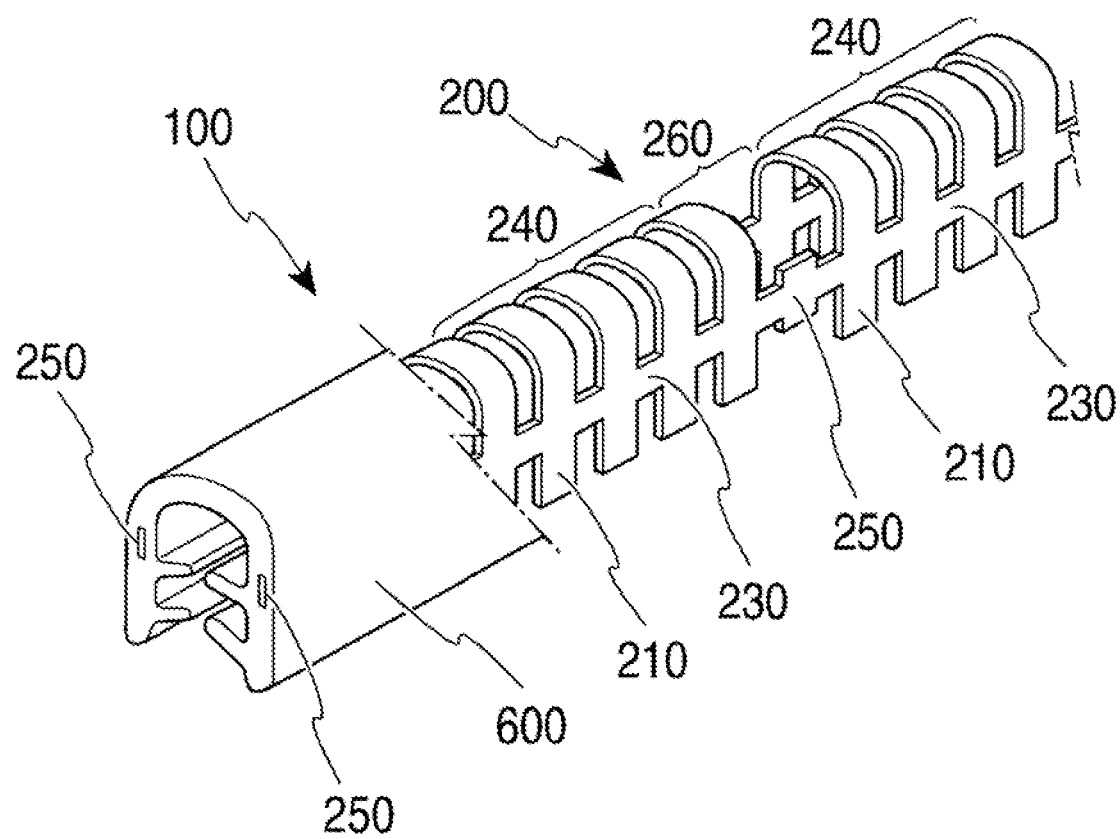
FIG. 9 is an explanatory view showing a structure of a cored bar insert trim disclosed in JP 11-321480 A as a background art.

As shown in FIGS. 4 and 6, the lower blade (die) 71, which is a fixed blade, has a projection 73 which includes an inclined surface 72 extending toward the upper blade (punch) 70. Generally, when a metal plate (workpiece) is sheared using a punch and a die, the punch is pressed against an upper surface of the workpiece. In this case, corners of the punch and the die exert a tensile force on the workpiece. When this tensile force exceeds a tolerable level, a crack (fracture surface) like a torn appears in the workpiece for shearing. Accordingly, slight sagging is produced at a corner of the workpiece.

According to the trim portion 20 of the weatherstrip 10 where the insert 40 is embedded, the insert 40 made of metal is in a state embedded in the polymer material portion 80. Therefore, when the lower blade (die) 71 having a flat surface is used, the lower blade (die) 71 is unable to directly hold the insert 40 in a state where the polymer material portion 80 is present between the lower blade (die) 71 and the insert 40 made of metal.

When shearing is performed in this state, a bending point of the insert 40 during shearing is largely moved toward an outer periphery of the upper blade (punch) 70. As a result, the insert 40 is bended before the upper blade (punch) 70 is pressed against the upper surface of the insert 40. Accordingly, at the time of completion of the cut-off portion forming step 57b, a sheared surface of the insert 40 is deformed toward the lower blade (die) 71. In this case, manual correction of the deformation is needed after the cutting.

According to the embodiment of the present invention, the lower blade (die) 71, which is a fixed blade, has the projection 73 which includes the inclined surface 72 extending toward the upper blade (punch) 70. Accordingly, the projection 73 bites the polymer material portion 80, thereby preventing generation of a bending point of the insert 40 on the outer side (outer periphery) of the upper blade (punch) 70, and preventing deformation of the cut-off portion 60 of the insert 40 toward the lower blade (die) 71.

Note that the height of the projection 73 is preferably equivalent to the thickness of the polymer material portion 80 present between the projection 73 and the insert 40. When the height is smaller than the thickness of the polymer material portion 80, the projection 73 is unable to sufficiently bite the polymer material portion 80. In this case, and the sheared surface of the insert 40 is deformed toward the lower blade (die) 71. On the other hand, when the height is larger than the thickness of the polymer material portion 80, the projection 73 pushes up the insert 40 from below after shearing of the insert 40. In this case, the sheared surface of the insert 40 is deformed toward the side opposite to the lower blade (die) 71.

According to the present embodiment, the lip 26 is formed below the trim portion 20. During formation of the cut-off portion 60, the lip 26 is deformed in accordance with lowering of the upper blade (punch) 70 and comes into contact with the bottom wall 23. Accordingly, the thickness equivalent to the thickness of the polymer material portion 80 in the present embodiment refers to the thickness of the polymer material portion 80 below the insert 40 at the beginning of the bite of the projection 73 of the lower blade (die) 71 into the lip 26 in accordance with lowering of the upper blade (punch) 70 in a state of contact between the lip 26 and the bottom wall 23.

According to the embodiment of the present invention, an inclination angle α of the inclined surface 72 of the lower blade (die) 71 inclined toward the upper blade (punch) 70 is 40°. This angle is preferably in a range from 30° to 60°. When the angle is smaller than 30°, the inclination becomes too gentle. In this case, the insert 40 is bent before the upper blade (punch) 70 is pressed against the upper surface of the insert 40. As a result, the insert 40 is deformed downward during formation of the cut-off portion 60. On the other hand, when the angle exceeds 60°, an angle of the projection 73 hitting the lower surface of the insert 40 decreases. In this case, a large force is applied to a tip of the projection 73 during shearing of the insert 40, and the tip of the projection 73 is easily broken. This condition is not a desirable condition.

In the subsequent cutting step 57c, as shown in FIG. 5B, the cutter 74 having a thin blade is vertically set at a longitudinal center of the cut-off portion 60 in a direction orthogonal to the longitudinal direction. In this condition, only the polymer material portion 80 not containing the insert 40 is cut by vertically moving the cutter 74.

The present invention is not limited to the embodiment described above, but may be practiced with various modifications without departing from the object of the present invention.

While the cutter 74 which has a thin blade and vertically moves for cutting is used as a cutting blade in the present embodiment, a rotary blade may be used instead of the cutter 74.

What is claimed is:

1. A weatherstrip manufacturing method for manufacturing a weatherstrip that includes a trim portion having a substantially U-shaped cross section and including an insert embedded in the trim portion, the insert having a belt shape and including strips connected via a connecting portion, wherein
   the connecting portion of the insert includes short connecting portions that connect the strips at substantially regular intervals, and a long connecting portion that has a larger length than each length of the short connecting portions; and
   the method comprising:
      an extrusion molding step for covering the insert with a polymer material;
      a cut-off portion forming step for cutting off a part of a long interval portion to form a cut-off portion, wherein the part of the long interval portion that is cut off includes the long connecting portion of the insert embedded in the long interval portion; and
      a cutting step for cutting the cut-off portion in a crossing direction orthogonal to a longitudinal direction to divide the weatherstrip in the longitudinal direction.

2. The weatherstrip manufacturing method according to claim 1, further comprising a long connecting portion forming step for forming the long connecting portion by cutting the strip in the short connecting portion of the insert before the extrusion molding step.

3. The weatherstrip manufacturing method according to claim 2, wherein the cut-off portion forming step is performed subsequent to the long connecting portion forming step.

4. The weatherstrip manufacturing method according to claim 1, wherein the cut-off portion forming step is performed by using a punch that is a movable upper blade, and a die that is a fixed lower blade, and
   inserting the punch from an opening side of the trim portion,
   wherein, in a cross-section perpendicular to the longitudinal direction, the die includes a projection that includes an inclined surface formed on two opposing sides of the punch extending toward the punch.

5. The weatherstrip manufacturing method according to claim 4, wherein a height of the projection is equal to a thickness of the polymer material covering the insert.

6. The weatherstrip manufacturing method according to claim 4, wherein an inclination angle of the inclined surface is between 30° and 60°.

7. The weatherstrip manufacturing method according to claim 1, wherein the cut-off portion forming step is performed subsequent to the extrusion molding step.

\* \* \* \* \*